(12) United States Patent
Arbuckle et al.

(10) Patent No.: US 8,808,139 B1
(45) Date of Patent: Aug. 19, 2014

(54) HYBRID MARINE PROPULSION SYSTEMS HAVING PROGRAMMABLE CLUTCH OPERATIONS

(75) Inventors: Jason S. Arbuckle, Horicon, WI (US); Wayne M. Jaszewski, Jackson, WI (US); Thomas S. Kirchhoff, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 252 days.

(21) Appl. No.: 13/475,682

(22) Filed: May 18, 2012

(51) Int. Cl.
*B60W 10/02* (2006.01)
*B60W 10/08* (2006.01)

(52) U.S. Cl.
USPC ............................................................ 477/5

(58) Field of Classification Search
CPC ..................................................... B60W 20/50
USPC .......................................... 477/5; 192/30 W
See application file for complete search history.

(56) References Cited

U.S. PATENT DOCUMENTS

| | | | |
|---|---|---|---|
| 1,332,631 A | | 3/1920 | Morse |
| 1,633,454 A | * | 6/1927 | Mills ............................. 310/106 |
| 3,230,698 A | | 1/1966 | Nettles |
| 3,503,464 A | | 3/1970 | Yardney |
| 3,566,717 A | | 3/1971 | Berman et al. |
| 3,650,345 A | | 3/1972 | Yardney |
| 3,703,642 A | | 11/1972 | Balaguer |
| 3,888,325 A | | 6/1975 | Reinbeck |
| 4,233,858 A | | 11/1980 | Rowlett |
| 4,338,525 A | | 7/1982 | Kilgore |
| 5,080,064 A | | 1/1992 | Buslepp et al. |
| 5,081,365 A | | 1/1992 | Field et al. |
| 5,301,764 A | | 4/1994 | Gardner |
| 5,616,056 A | | 4/1997 | Meissner |
| 5,835,876 A | | 11/1998 | Hathaway et al. |
| 5,848,582 A | | 12/1998 | Ehlers et al. |
| 5,880,575 A | | 3/1999 | Itou et al. |
| 5,969,624 A | | 10/1999 | Sakai et al. |

(Continued)

FOREIGN PATENT DOCUMENTS

DE 101 53 586 A1 5/2002
DE 103 18 293 A1 11/2004

OTHER PUBLICATIONS

Web Page for PowerCharge Battery Charger HV Series—Overview; http://www.powerdesignersusa.com/powercharge_hv.htm, last visited Jan. 27, 2011 (one page), copyright 2004.

(Continued)

*Primary Examiner* — Sherry Estremsky
(74) *Attorney, Agent, or Firm* — Andrus Intellectual Property Law, LLP

(57) ABSTRACT

A marine propulsion system has a propulsor that propels a marine vessel, an internal combustion engine that powers the propulsor via a driveshaft, a clutch that is movable between a closed position wherein the engine is operationally connected to the driveshaft and an open position wherein the engine is operationally disconnected from the driveshaft, and an electric motor that selectively applies torque on the driveshaft. A control circuit is programmed to move the clutch into the open position; and to cause the motor to selectively apply a load torque on the driveshaft, to thereby dislodge the clutch from the closed position. The control circuit can also be programmed to compare rotational speeds of the engine and motor to thereby determine whether the clutch is in one of the open and closed positions.

10 Claims, 5 Drawing Sheets

(56) References Cited

U.S. PATENT DOCUMENTS

| | | |
|---|---|---|
| 6,009,371 A | 12/1999 | Kobayashi |
| 6,133,707 A | 10/2000 | Kikuchi et al. |
| 6,396,161 B1 | 5/2002 | Crecelius et al. |
| 6,443,286 B1 | 9/2002 | Bratel et al. |
| 6,517,464 B2 * | 2/2003 | Yamazaki et al. ............. 477/5 |
| 6,554,088 B2 | 4/2003 | Severinsky et al. |
| 6,587,765 B1 | 7/2003 | Graham et al. |
| 6,662,742 B2 | 12/2003 | Shelton et al. |
| 6,701,890 B1 | 3/2004 | Suhre et al. |
| 6,757,606 B1 | 6/2004 | Gonring |
| 6,758,198 B1 | 7/2004 | Suhre et al. |
| 6,800,004 B1 | 10/2004 | White et al. |
| 6,821,171 B1 | 11/2004 | Wynveen et al. |
| 6,857,918 B1 | 2/2005 | Lebreux et al. |
| 6,882,129 B2 | 4/2005 | Boskovitch et al. |
| 6,915,781 B2 | 7/2005 | Rayl |
| 6,919,711 B2 | 7/2005 | Haydock et al. |
| 6,978,617 B2 | 12/2005 | Goldmeer et al. |
| 6,982,632 B2 | 1/2006 | Nagasaka et al. |
| 7,147,523 B2 | 12/2006 | Mori |
| 7,241,192 B2 | 7/2007 | Andersen et al. |
| 7,287,443 B2 * | 10/2007 | Kuhstrebe et al. ............. 74/335 |
| 7,296,648 B2 | 11/2007 | Tatara et al. |
| 7,318,396 B1 | 1/2008 | Belter et al. |
| 7,473,148 B2 | 1/2009 | Ichikawa et al. |
| 7,473,149 B2 | 1/2009 | Mizokawa |
| 7,482,767 B2 | 1/2009 | Tether |
| 7,518,344 B2 | 4/2009 | Sihler |
| 7,530,864 B2 | 5/2009 | Kaji |
| 7,556,547 B2 | 7/2009 | Kaji |
| 7,565,939 B2 | 7/2009 | Ando et al. |
| 7,621,789 B2 | 11/2009 | Mizokawa |
| 7,769,504 B2 | 8/2010 | Kaji |
| 7,808,211 B2 | 10/2010 | Pacholok et al. |
| 7,862,393 B2 | 1/2011 | Levander et al. |
| 8,039,976 B2 | 10/2011 | Sato et al. |
| 8,062,081 B2 | 11/2011 | Barrett et al. |
| 8,290,682 B2 | 10/2012 | Ewert et al. |
| 8,436,583 B2 | 5/2013 | Guang et al. |
| 8,453,772 B2 | 6/2013 | Brown |
| 2002/0005178 A1 | 1/2002 | Iwatani et al. |
| 2004/0163861 A1 | 8/2004 | Fukuda et al. |
| 2005/0106953 A1 | 5/2005 | Andersen et al. |
| 2006/0025025 A1 | 2/2006 | Kitani et al. |
| 2006/0040791 A1 | 2/2006 | Nakajima et al. |
| 2006/0096555 A1 | 5/2006 | Buck |
| 2006/0166573 A1 | 7/2006 | Vetta et al. |
| 2007/0062744 A1 | 3/2007 | Weidenheimer et al. |
| 2008/0041327 A1 | 2/2008 | Lewis et al. |
| 2008/0120516 A1 | 5/2008 | Thor |
| 2008/0195287 A1 * | 8/2008 | Janssen et al. ............. 701/67 |
| 2009/0156068 A1 | 6/2009 | Barrett et al. |
| 2009/0176417 A1 | 7/2009 | Rembach et al. |
| 2009/0284228 A1 | 11/2009 | Kumar |
| 2009/0288896 A1 | 11/2009 | Ichikawa |
| 2009/0302616 A1 | 12/2009 | Peterson |
| 2010/0075798 A1 * | 3/2010 | Suzuki et al. ............. 477/5 |
| 2010/0105259 A1 | 4/2010 | Wejrzanowski et al. |
| 2010/0123436 A1 | 5/2010 | Herrod et al. |
| 2010/0125383 A1 | 5/2010 | Caouette |
| 2010/0144219 A1 | 6/2010 | Balogh et al. |
| 2010/0250041 A1 | 9/2010 | Li |
| 2011/0021313 A1 * | 1/2011 | Steinborn et al. ............. 477/5 |
| 2011/0195618 A1 | 8/2011 | Arbuckle et al. |
| 2011/0237141 A1 | 9/2011 | Tamba |
| 2013/0274969 A1 * | 10/2013 | Wang et al. ............. 701/22 |

OTHER PUBLICATIONS

Web Page for PowerCharge Battery Charger HV Series—Specifications; http://www.powerdesignersusa.com/powercharge_hv_specs.htm, last visited Jan. 27, 2011 (two pages), copyright 2004.

* cited by examiner

HYBRID MARINE PROPULSION SYSTEMS HAVING PROGRAMMABLE CLUTCH OPERATIONS

FIELD

The present disclosure relates to marine vessels and more particularly to operations of clutches in hybrid marine propulsion systems.

BACKGROUND

A typical marine vessel has one or more internal combustion engines that drive a propulsor, such as for example a propeller, impeller, pod drive, stern drive, outboard drive and/or the like. The one or more internal combustion engines provide thrust necessary to propel the vessel. Some marine vessels also include one or more electric motors, which are typically battery-powered motors utilized for trolling.

Abandoned U.S. patent application Ser. No. 11/505,075, which is incorporated herein by reference in entirety, discloses marine propulsion systems that connect both an internal combustion engine and an electric motor to a propulsor in torque-transmitting relations so that the propulsor can selectively receive a sum of the torque provided by the engine and the motor.

U.S. patent application Ser. No. 12/910,495, which is incorporated herein by reference, discloses a hybrid marine propulsion system including a marine propulsor that propels a marine vessel; an internal combustion engine that selectively powers the marine propulsor; an electric motor that selectively powers the marine propulsor; and a control circuit that controls operation of the internal combustion engine and the electric motor according to a plurality of modes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one example, a marine propulsion system comprises a propulsor that propels a marine vessel; an internal combustion engine that powers the propulsor via a driveshaft; a clutch that is movable between a closed position wherein the engine is operationally connected to the driveshaft and an open position wherein the engine is operationally disconnected from the driveshaft; an electric motor that selectively applies torque on the driveshaft; and a control circuit that controls the motor to selectively apply a load torque on the driveshaft. The control circuit is programmed to control the motor to apply the load torque on the driveshaft after the clutch is requested to move into the open position, to thereby dislodge the clutch from the closed position, if necessary.

In further example, the control circuit is programmed to compare rotational speeds of the engine and motor to thereby determine whether the clutch is in one of the open and closed positions.

According to another example, a method comprises operating the control circuit to move the clutch into the open position; and then operating the control circuit to cause the electric motor to selectively apply a load torque on the driveshaft, to thereby dislodge the clutch from the closed position.

In yet another example, a method comprises operating the control circuit to request the clutch to move from one of the open position and closed position to the other of the open position and closed position, and then operating the control circuit to compare rotational speeds of the engine and motor to determine whether the clutch is in one of the open and closed positions.

Various other aspects and exemplary combinations for these examples are further described herein below.

BRIEF DESCRIPTION OF THE DRAWINGS

Examples of methods and systems for controlling shift in marine propulsion devices are described with reference to the following figures. The same numbers are used throughout the figures to reference like features and components.

DETAILED DESCRIPTION OF THE DRAWINGS

In the present description, certain terms have been used for brevity, clearness and understanding. No unnecessary limitations are to be inferred therefrom beyond the requirement of the prior art because such terms are used for descriptive purposes only and are intended to be broadly construed. The different methods and systems described herein may be used alone or in combination with other methods and systems. Various equivalents, alternatives, and modifications are possible within the scope of the appended claims.

Figure 1:
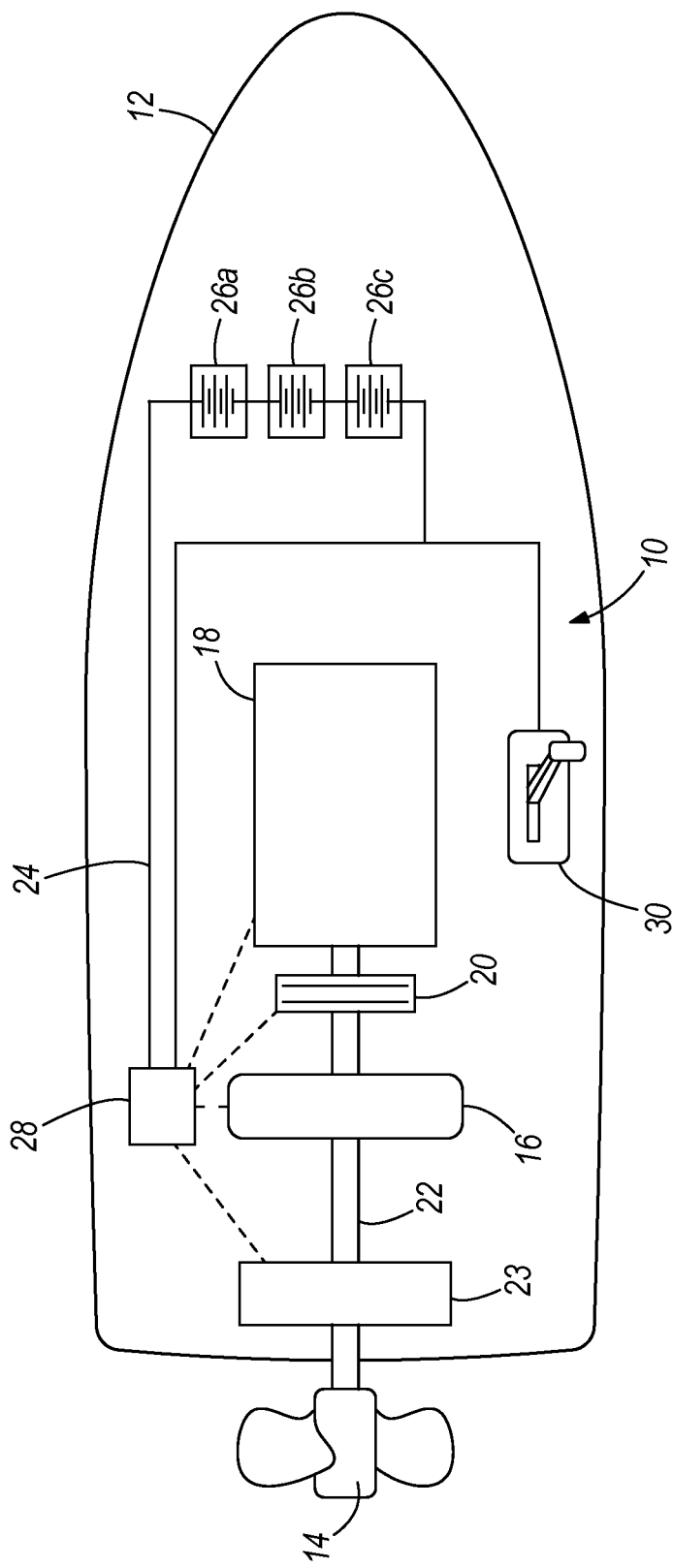
FIG. 1 is a schematic depiction of an exemplary marine vessel having a hybrid marine propulsion system.

FIG. 1 depicts a hybrid marine propulsion system 10 for a marine vessel 12. The system 10 includes among other things one or more propulsors 14 (collectively referred to herein as "propulsor"), which can include any type of device for propelling the marine vessel 12 including but not limited to one or more propellers (as shown in FIG. 1), impellers, stern drives, pod drives, and/or the like. The propulsor 14 is selectively driven by one or more electric machines such as for example electric motors 16 (collectively referred to herein after as "motor"), one or more internal combustion engines 18 (collectively referred to herein after as "engine"), and a combination of the motor 16 and engine 18. In the example shown, the system 10 also includes one or more clutches 20 (collectively referred to herein after as "clutch") for selectively connecting and disconnecting the engine 18 from a driveshaft 22 that extends from the engine 18 to a transmission 23 for driving the propulsor 14. The engine 18 can include a diesel engine or any other type of engine for providing power to the propulsor 14. The clutch 20 can include any type of clutch for connecting and disconnecting the engine 18 and driveshaft 22. The examples provided herein have been found to be particularly useful in systems that include one or more automotive style clutches, such as for example a clutch that includes a throw out bearing and shift fork as well as a pressure plate, clutch disk, and diaphragm spring, which is bolted to a flywheel, which is bolted to the end of a crankshaft on the engine 18. This type of clutch is commercially available from several different suppliers including Luk, Sachs, and Exedy. This is just one example however and the present disclosure can be applied with other styles of clutch.

The clutch 20 can be moved between a closed position wherein the engine 18 is operationally connected to the driveshaft 22 and an open position wherein the engine 18 is operationally disconnected from the driveshaft 22. An actuator (not shown) can be associated with the clutch to cause the noted movement between the closed and open positions. One example of such an actuator is a 12-volt Thomson linear actuator, which also includes an internal potentiometer for indicating clutch position. Other types of actuators can be substituted for the Thomson linear actuator and accomplish the objectives described herein.

The motor 16 is located between the clutch 20 and transmission 23 and is configured to apply torque to rotate the driveshaft 22 at the same time or separately from the engine 18. In the example shown, the driveshaft 22 extends through and forms a part of the motor 16; however, arrangements where the motor 16 and driveshaft 22 are separate components are also contemplated by this disclosure. Together, the engine 18, clutch 20, motor 16 and transmission 23 provide forward, neutral, and reverse operations of propulsor 14 in a "parallel" drive arrangement; however it should be recognized that the examples shown and described are not intended to be limiting.

The system 10 further includes one or more rechargeable storage batteries 26a, 26b, 26c, which are connected in electrical communication with the motor 16 and discharge current to power the motor 16. In FIG. 1, three batteries 26a, 26b, 26c are shown connected in series with each other and to system 10; however the number of batteries 26 and the configuration thereof can be easily modified and such modifications are contemplated by this disclosure.

In a preferred arrangement, the motor 16 can be an electric machine that is also operable as a generator to recharge the batteries 26. In this arrangement, the motor/generator 16 is connectable in torque transmitting relation with, and driven by, the engine 18, which in turn provides a supply of current for recharging batteries 26a, 26b, 26c. It is not required that the motor also function as a generator.

Figure 2:
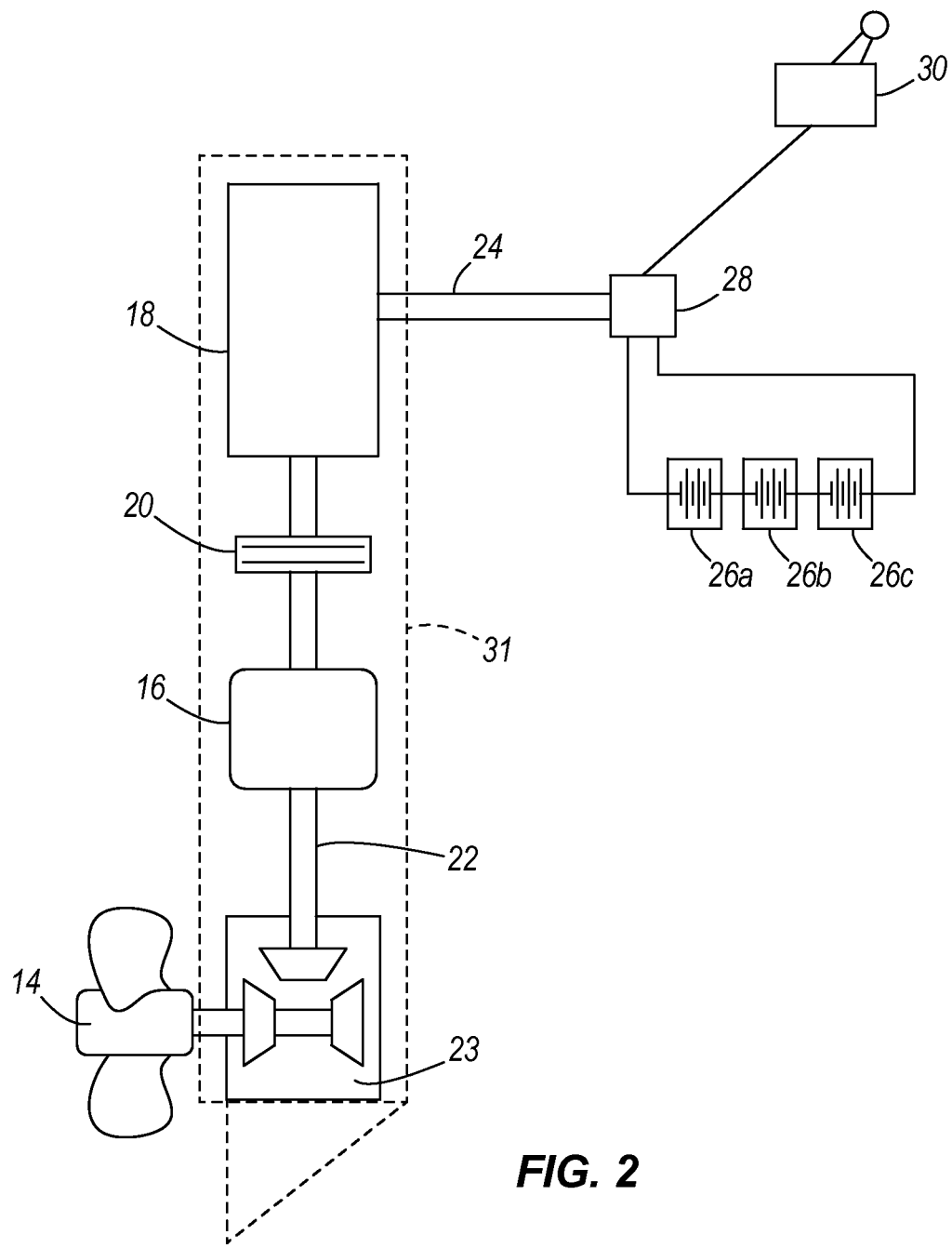
FIG. 2 is a schematic depiction of an exemplary marine vessel having a hybrid marine propulsion system configured as an outboard motor.

FIG. 1 depicts an inboard or pod drive marine arrangement; however the concepts disclosed in this application are applicable to any type of marine propulsion system, such as for example an outboard motor arrangement. FIG. 2 depicts an outboard motor 31 according to such an arrangement, having reference numbers corresponding to the structures described herein above with reference to FIG. 1.

Figure 3:
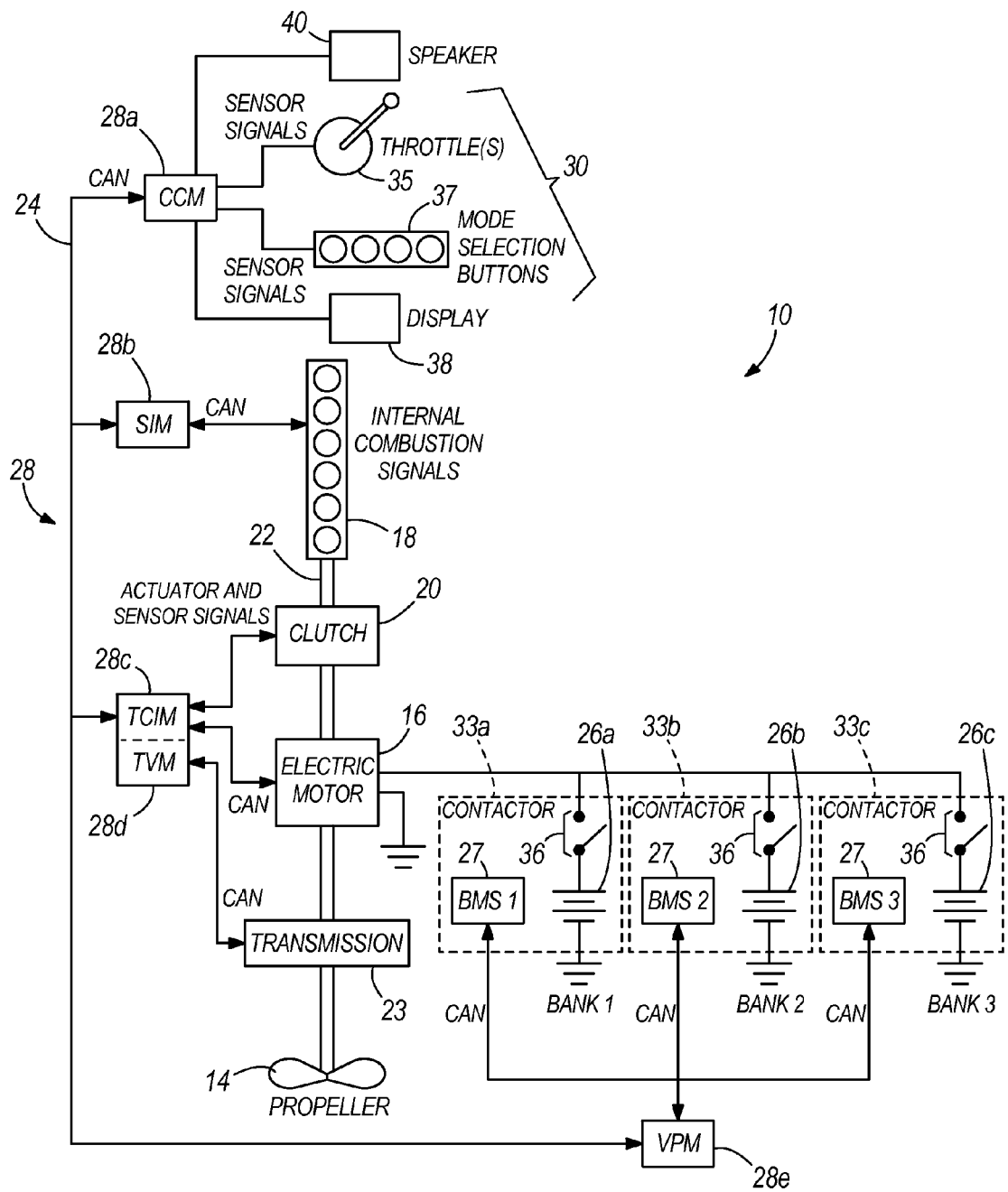
FIG. 3 is a schematic depiction of an exemplary hybrid marine propulsion system.

Referring to FIG. 3, the system 10 also includes a control circuit 28 comprising a control circuit area network 24 (CAN) for operating the system 10 in a plurality of operational modes. The control circuit 28 is shown schematically and includes a plurality of control circuit sections 28a-28e, each section having a memory and programmable processor for processing computer code, for sending and receiving electronic control signals, for communicating with other control circuits in the CAN 24, and for controlling operations of certain components in the system 10 such as the engine 18, clutch 20, and motor 16. The programming and operations of the control circuit 28 and its sections 28a-28e are described in further detail below with respect to non-limiting examples and/or algorithms. While each of these examples/algorithms includes a specific series of steps for accomplishing certain system control functions, the scope of this disclosure is not intended to be bound by the literal order or literal content of steps described herein, and all non-substantial differences or changes still fall within the scope of the disclosure. Also, the configuration of the control circuit 28, CAN 24, and sections 28a-28e can vary significantly. For example, the control circuit 28 does not need to include separately located sections and can instead comprise a single control device located at one location. Conversely the control circuit 28 can include more sections than those shown and sections located at different locations than those shown.

In the example shown, the control circuit 28 includes a command control section 28a (CCM) that is configured to receive user inputs from a user input device 30. The user input device 30 is shown schematically in FIGS. 1 and 2 as a conventional combination throttle/shift lever 35 and in FIG. 3 as also including a plurality of mode selection buttons 37; however, the user input device 30 is not limited to these configurations and can additionally or alternately comprise other devices for inputting commands to the system 10, such as more or fewer input keys than that shown, joysticks, touch screens, and/or the like, and any other structure that could be substituted by one having ordinary skill in the art to input user commands into a control system. In the example shown, actuation of the user input device 30 is sensed by sensors (not shown) and communicated to the command control section 28a via the CAN 24.

The command control section 28a is programmed to convert the user inputs into electronic commands and then send the commands to other control circuit sections in the system 10. In this example, the other control circuit sections include a transmission/engine control circuit (SIM) 28b that controls engine/transmission/shifting and reads signals regarding transmission state and output speed; a thermal, clutch motor interface module (TCIM) 28c and drive control module (TVM) 28d that control the cooling system, and provide communication interface between the CAN 24 and a control circuit section (not shown) for the motor 16; and that receive commands from the command control section 28a and control for example a pod drive to a particular steering angle. Again, the CAN 24 shown in FIG. 3 is exemplary and could be significantly changed and still fall within the scope of the present disclosure and achieve the system functional activities set forth herein.

The various control sections are also capable of requesting changes in a current operational state of the components in the system 10, for example a change in condition of clutch 20 between its open and closed position. In one example, the control sections 28a, 28c and/or 28d can be programmed to command movement of the clutch 20 between its closed position wherein the engine 18 is operationally connected to the driveshaft 22 and its open position wherein the engine 18 is operationally disconnected from the driveshaft 22. These changes can be based upon inputs by the user at device 30 or based upon a change in an operational characteristic of the system 10. For example, the module 28a can be programmed to send and receive signals with the noted control sections 28c, 28d and with the actuator for the clutch 20. User inputs at input device 30 are received by the control module 28a and communicated to the control modules 28c, 28d, which in turn sends command signals to the noted actuator for the clutch 20. As stated above, different control arrangements can be employed to accomplish the objectives described herein.

The various control sections are also capable of monitoring a current operational state of components in the system 10, such as for example the condition of the actuator associated with clutch 20. In this particular example, the control modules 28c, 28d monitor digital counts output from the potentiometer on the noted actuator for clutch 20. The control modules 28c, 28d read the potentiometer signal from the actuator using an analog to digital converter. The received digital counts are compared to predetermined thresholds to determine the position of clutch 20. In addition, speeds of the motor 16 and engine 18 are sensed and communicated to the control module 28a via the CAN 24.

During operation of the marine vessel 12, the control circuit 28 is programmed to switch amongst different modes of control, including for example (1) an Engine Mode, wherein the engine 18 is connected to the propulsor 14 by the clutch 20 and all of the driving force to the propulsor 14 is provided by the engine 18; (2) an Electric Mode, wherein the motor 16 is connected to the propulsor 14 and all of the driving force to the propulsor 14 is provided by the motor 16; and (3) a Combined Mode wherein both the engine 18 and the motor 16 are connected to the propulsor 14 and the driving force to the propulsor 14 is provided by a combination of the engine 18 and the motor 16. In addition, for example, it can be desirable to operate a "Boost Mode" in which the engine 18 provides the primary driving force to the propulsor 14, while an additional "boost" driving force is temporarily provided by the motor 16 for temporary increased performance. Also, as discussed above, when the engine 18 is providing output to the system 10, the control circuit 28 can operate a Charge Mode wherein the motor 16 is controlled to perform as a generator, thereby providing a recharge current to the batteries 26a, 26b, 26c. Charge Mode typically is enacted during Combined Mode operation, for example, when both the motor 16 and engine 18 are connected in parallel via the driveshaft 22.

Which mode of operation is utilized by the control circuit 28 at any given time can depend upon the specific operating conditions or "operational criteria" of the vessel 12. The operational criteria upon which the control circuit 28 typically operates the system 10 and controls changes between the various operational modes can include for example a demand placed on the system 10 by an operator of the marine vessel 12, for example a demanded performance characteristic of the marine vessel such as a change in translational velocity of the vessel, change in direction of vessel translation, and the like. Other "operational criteria" can include a charge state of one or more of the batteries 33a-33c. For example if the charge state drops below a predetermined value, the control circuit 28 can be programmed to switch to Engine Mode and also further into Charge Mode.

The system 10 is configured to provide switching between the various modes of operation based upon the noted operational criteria while the engine 18 is running and/or while the motor 16 is running and with the propulsor 14 in neutral or in gear. For example, the control circuit 28 can be programmed to switch into Electric Mode when the vessel 12 is operated at low speeds to thereby provide quieter vessel operation and more fuel-efficient vessel operation. The control circuit 28 can be programmed to switch into Combined Mode, and more specifically into Charge Mode, when the power of the plurality of batteries 26a, 26b, 26c is low to thereby draw recharging current from the engine 18.

Referring to FIG. 3, each battery 26a, 26b, 26c is part of a battery bank 33a, 33b, 33c that also includes a monitor 27 (BMS) that reads signals from the individual batteries and a contactor 36 that is configured to connect and disconnect the respective battery 26a, 26b, 26c from the system 10. Each contactor 36 is configured such that if for example more than a predetermined amount of current is received by that respective battery during recharging or if the battery discharges more than a predetermined amount of current to the system 10 to power the motor 16, the contactor 36 opens and the battery is disconnected from the system 10. This type of battery is conventional and commercially available for example from Valence Technology Inc. In the system 10 depicted in FIG. 3, each monitor 27 is connected to a vessel power module 28e (VPM), also referred to herein after as a "calculation section" 28e. The calculation section 28e controls operation of the battery banks 33a, 33b, 33c and also serves as an interface to other control circuit sections in the system 10.

During research and development of marine propulsion systems, the present inventors have realized that over time, clutches in hybrid marine propulsion systems can become corroded. This is especially true in salt water environments. It is also true in situations where a clutch remains in a single state for a significant period of time, which can occur when a user decides to use only Electric Mode or only Engine Mode for a period of time, or when a marine vessel is unused or stored for a long period of time. Build-up of corrosion on components of the clutch, such as for example its linkages, flywheel, throw out bearing, shift fork, etc. can prevent its proper operation. Corrosion can prevent the clutch from properly moving between its closed and open positions, thus preventing complete connection and/or disconnection of the engine and driveshaft. The inventors have also found that mating surfaces on components of a clutch typically should not be coated with paint or other corrosion inhibitors, since this has been found to reduce the ability of the clutch to transfer torque. Individually treating or coating the clutch components prior to assembly, or masking to protect the mating surfaces yet provide adequate coverage to other necessary components, can be extremely expensive and therefore cost-prohibitive.

The present disclosure provides systems and methods for overcoming these problems. In one example, the control circuit 28 is advantageously programmed to control the electric motor 16 to selectively apply a load torque on the driveshaft 22 once the clutch 20 has been requested to move into its open position. This has been found to help dislodge the clutch 20 from its closed position in situations where the clutch 20 has become stuck in its closed position due to corrosion on components of the clutch 20. In some examples, the control circuit 28 controls the electric motor 16 to apply the noted load torque on the driveshaft 22 at (e.g. immediately after) startup of the system 10. As explained further below, the control circuit 28 is programmed to first control the clutch 20 to move into the open position and thereafter to control the electric motor 16 to apply the load torque on the driveshaft 22. As explained above, this will help ensure that the clutch 20 is not prevented from moving into its open position by corrosion on the components of the clutch 20. In these examples, the calculation, monitoring and control actions can be taken by, for example, the control sections 28a, 28c and/or 28d; however this example is not limiting and different sections of the control circuit 28 can be employed.

Optionally, the control circuit 28 can further be programmed to compare rotational speeds of the engine 18 and motor 16 to thereby determine whether the clutch 20 is in one of its open and closed positions. The control circuit 28 determines that the clutch 20 is in the closed position when the rotational speed of the motor 16 is substantially equivalent to the rotational speed of the engine 18. The control circuit 28 determines that the clutch 20 is in its open position when the rotational speed of the motor 16 is not substantially equivalent to the rotational speed of the engine 18. In some examples, the control circuit 28 can be programmed to compare the rotational speeds of the engine 18 and motor 16 after startup of the system 10 and also after the control circuit 28 has applied an initial load torque, as described above, to dislodge the clutch 20 from its closed position. In these examples, the calculation, monitoring and control actions can be taken by, for example, the command control section 28a and/or the control sections 28c and/or 28d; however this example is not limiting and different sections of the control circuit 28 can be employed.

Figure 4:
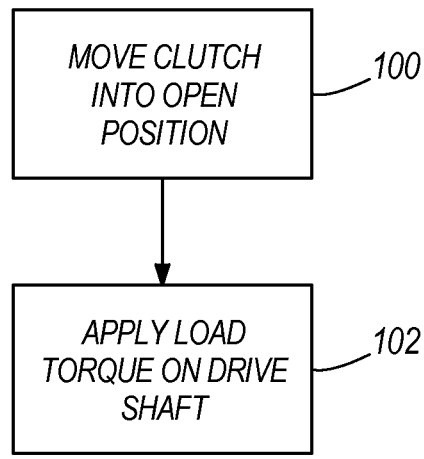
FIG. 4 is a flow chart depicting one example of a method for controlling a hybrid marine propulsion system.
Figure 5:
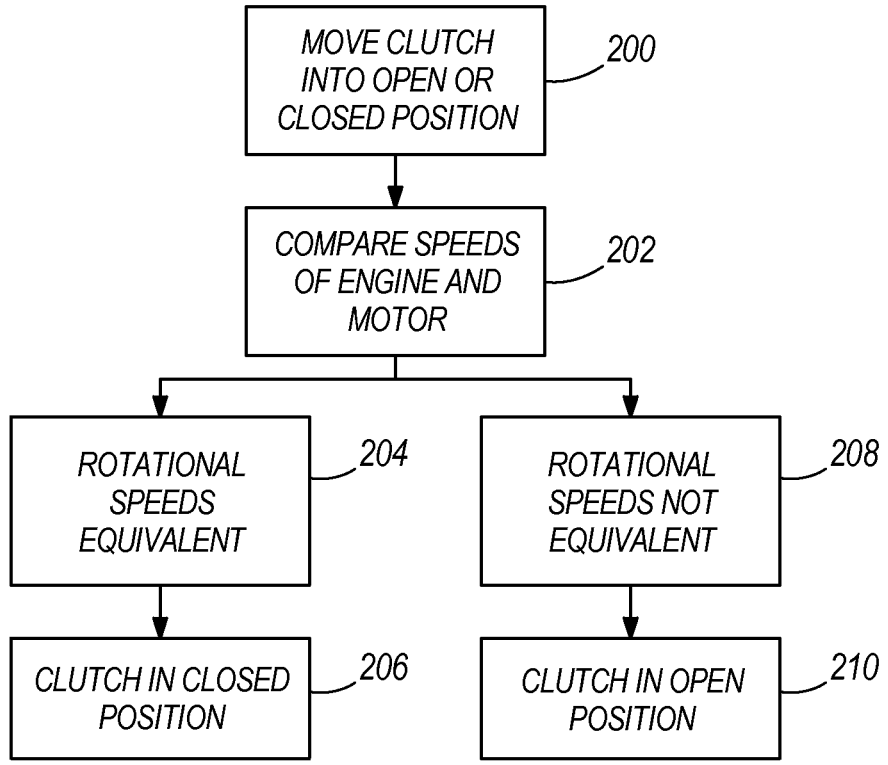
FIG. 5 is a flow chart depicting another example of a method for controlling a hybrid marine propulsion system.
Figure 6:
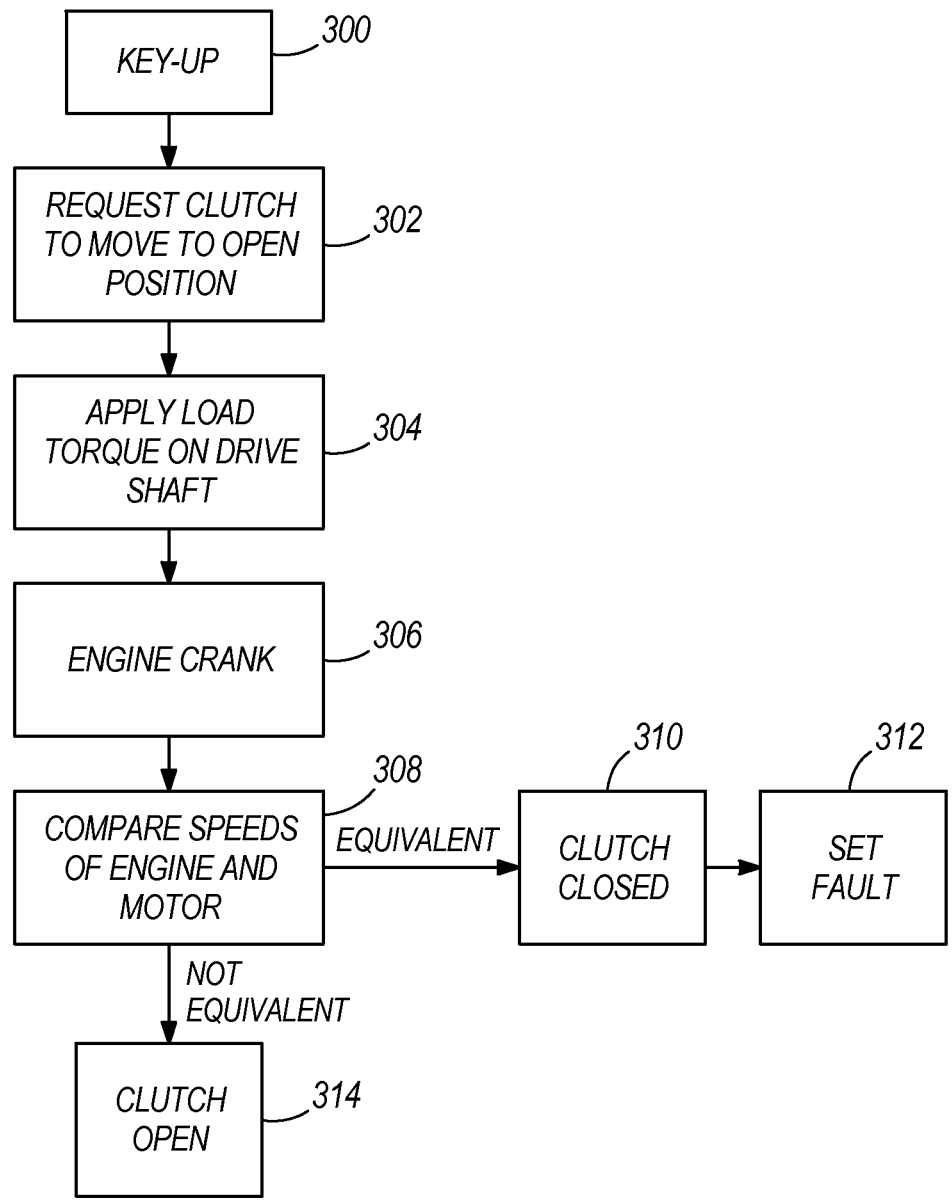
FIG. 6 is a flow chart depicting another example of a method for controlling a hybrid marine propulsion system.

FIGS. 4-6 depict some examples of methods for operating a marine propulsion system, such as the system 10.

FIG. 4 depicts one example. At step 100, the control circuit 28 is operated to move the clutch 20 into its open position. At step 102, the control circuit 28 is operated to cause the motor 16 to selectively apply a load torque on the driveshaft 22, to thereby dislodge the clutch 20 from its closed position.

FIG. 5 depicts another example. At step 200, the control circuit 28 is operated to move the clutch 20 from one of its open and closed positions to the other of its open and closed positions. At step 202, the control circuit 28 compares rotational speeds of the engine 18 and motor 16 to thereby determine whether the clutch 20 is in one of its open and closed positions. For example, at step 204, the control circuit 28 determines that the rotational speed of the motor 16 is substantially equivalent to the rotational speed of the engine 18. At step 206, the control circuit 28 determines that the clutch 20 is in the closed position based upon the result at step 204. Alternately, at step 208, the control circuit 28 determines that the rotational speed of the motor 16 is not substantially equivalent to the rotational speed of the engine 18. At step 210, the control circuit 28 determines that the clutch 20 is in its open position based upon the result at step 208.

FIG. 6 depicts another example. At step 300, the user "keys up" the system 10 by, for example, inserting a key or actuating some other type of input device on the user input 30 to cause the control circuit 28 to start. At step 302, the control circuit 28 commands the clutch 20 to move into its open position. At step 304, the control circuit 28 commands the motor 16 to apply a load torque on the driveshaft 22. At step 306, the user further requests at the engine 18 to start by actuating the input device 30. At step 308, the control circuit 28 compares the speeds of the engine 18 and motor 16. If the respective speeds are equivalent, at step 310, the control circuit 28 determines that the clutch is closed and then at step 312 sets a fault, such as for example an alarm for the user to see or hear. The alarm can be conveyed to the user, for example at the helm of the vessel 12. If the speeds are not equivalent, at step 314, the control circuit 28 determines that the clutch 20 is in its open position.

What is claimed is:

1. A marine propulsion system comprising:
   a propulsor that propels a marine vessel;
   an internal combustion engine that powers the propulsor via a driveshaft;
   a clutch that is movable between a closed position wherein the internal combustion engine is operationally connected to the driveshaft and an open position wherein the internal combustion engine is operationally disconnected from the driveshaft;
   an electric motor that selectively applies torque on the driveshaft; and
   a control circuit that controls the electric motor to selectively apply a load torque on the driveshaft after the clutch is requested to move into the open position, to thereby dislodge the clutch from the closed position;
   wherein the control circuit further compares the rotational speed of the motor to a rotational speed of the internal combustion engine to determine whether the clutch is in one of the open and closed positions.

2. The marine propulsion system according to claim 1, wherein the control circuit determines that the clutch is in the closed position when the rotational speed of the motor is substantially equivalent to the rotational speed of the internal combustion engine.

3. The marine propulsion system according to claim 2, wherein the control circuit determines that the clutch is in the open position when the rotational speed of the motor is not substantially equivalent to the rotational speed of the internal combustion engine.

4. The marine propulsion system according to claim 1, wherein the control circuit controls the electric motor to apply the load torque on the driveshaft at start-up of the system.

5. A mine propulsion system comprising:
   a propulsor that propels a marine vessel;
   an internal combustion engine that powers the propulsor via a driveshaft;
   a clutch that is movable between a closed position wherein the internal combustion engine is operationally connected to the driveshaft and an open position wherein the internal combustion engine is operationally disconnected from the driveshaft;
   an electric motor that selectively applies torque on the driveshaft; and
   a control circuit that controls the electric motor to selectively apply a load torque on the driveshaft after the clutch is requested to move into the open position, to thereby dislodge the clutch from the closed position;
   wherein the control circuit controls the electric motor to apply the load torque on the driveshaft at start-up of the system; and
   wherein the control circuit first controls the clutch to move into the open position and thereafter controls the electric motor to apply the load torque on the driveshaft.

6. The marine propulsion system according to claim 5, wherein after start-up of the system, the control circuit compares the respective rotational speeds of the internal combustion engine and electric motor to thereby determine whether the clutch is in one of the open and closed positions.

7. In a marine propulsion system comprising a propulsor that propels a marine vessel, an internal combustion engine that powers the propulsor via a driveshaft, a clutch that is movable between a closed position wherein the internal combustion engine is operationally connected to the driveshaft and an open position wherein the internal combustion engine is operationally disconnected from the driveshaft and an electric motor that selectively applies torque on the driveshaft; a method comprising:
   operating a control circuit to move the clutch into the open position;
   operating the control circuit to cause the electric, motor to selectively apply a load torque on the driveshaft, to thereby dislodge the clutch from the closed position; and
   operating the control circuit to compare a rotational speed of the motor to a rotational speed of the internal combustion engine to determine whether the clutch is in one of the open and closed positions.

8. The method according to claim 7, further comprising operating the control circuit to determine that the clutch is in the closed position when the rotational speed of the motor is substantially equivalent to the rotational speed of the internal combustion engine.

9. The method according to claim 7, further comprising operating the control circuit to determine that the clutch is in the open position when the rotational speed of the motor is not substantially equivalent to the rotational speed of the internal combustion engine.

10. The method according to claim 7 further comprising operating the control circuit to control the electric motor to apply the load torque on the driveshaft at start-up of the system.

\* \* \* \* \*

UNITED STATES PATENT AND TRADEMARK OFFICE
CERTIFICATE OF CORRECTION

PATENT NO. : 8,808,139 B1
APPLICATION NO. : 13/475682
DATED : August 19, 2014
INVENTOR(S) : Jason S. Arbuckle et al.

Page 1 of 1

It is certified that error appears in the above-identified patent and that said Letters Patent is hereby corrected as shown below:

In the Claims
Claim 5 should read as:
Claim 5: A ~~mine~~ <u>marine</u> propulsion system comprising:
    a propulsor that propels a marine vessel;
    an internal combustion engine that powers the propulsor via a driveshaft;
    a clutch that is movable between a closed position wherein the internal combustion engine is operationally connected to the driveshaft and an open position wherein the internal combustion engine is operationally disconnected from the driveshaft;
    an electric motor that selectively applies torque on the driveshaft; and
    a control circuit that controls the electric motor to selectively apply a load torque on the driveshaft after the clutch is requested to move into the open position, to thereby dislodge the clutch from the closed position;
    wherein the control circuit controls the electric motor to apply the load torque on the driveshaft at start-up of the system; and
    wherein the control circuit first controls the clutch to move into the open position and thereafter controls the electric motor to apply the load torque on the driveshaft.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,808,139 B1
APPLICATION NO. : 13/475682
DATED : August 19, 2014
INVENTOR(S) : Jason S. Arbuckle et al.

Page 1 of 1

It is certified that error appears in the above-identified patent and that said Letters Patent is hereby corrected as shown below:

In the Claims
Column 8, lines 12-32,
Claim 5 should read as:
Claim 5: A ~~mine~~ marine propulsion system comprising:
    a propulsor that propels a marine vessel;
    an internal combustion engine that powers the propulsor via a driveshaft;
    a clutch that is movable between a closed position wherein the internal combustion engine is operationally connected to the driveshaft and an open position wherein the internal combustion engine is operationally disconnected from the driveshaft;
    an electric motor that selectively applies torque on the driveshaft; and
    a control circuit that controls the electric motor to selectively apply a load torque on the driveshaft after the clutch is requested to move into the open position, to thereby dislodge the clutch from the closed position;
    wherein the control circuit controls the electric motor to apply the load torque on the driveshaft at start-up of the system; and
    wherein the control circuit first controls the clutch to move into the open position and thereafter controls the electric motor to apply the load torque on the driveshaft.

This certificate supersedes the Certificate of Correction issued October 21, 2014.

Signed and Sealed this
Eighteenth Day of November, 2014

Michelle K. Lee
*Deputy Director of the United States Patent and Trademark Office*